Patented Nov. 2, 1937

2,097,545

UNITED STATES PATENT OFFICE 2,097,545

THE PROCESS OF PRODUCING DISTILLED ALCOHOLIC SPIRITS

Frederick S. Bowden and Richard B. Bowden, Kansas City, Kans., assignors to White Springs Distillery, Inc., a corporation of Missouri No Drawing. Application June 4, 1934, Serial No. 728,954

2 Claims. (Cl. 99—40)

This invention relates to the art of distilling alcoholic spirits and has for a primary object, the provision of a unique and novel process of purifying, mellowing and aging whiskey, which permits the manufacture and sale of such liquor without the necessity of allowing the elapse of an extended period of time for accomplishing the mellowing and aging actions to which the liquor must be subjected before it is marketable.

One of the important aims of this invention is the provision of a process of the aforementioned character which may be employed in distillation of alcoholic spirits, whether through the continuous run method of distilling or through the batch run method, the results being the same in either instance providing the steps of the process are carefully followed in the manner set down in sequence indicated by the following detailed specification.

Under present practices of distilling alcoholic spirits for consumption shortly after distillation, the resultant product has been found to be exceptionally impure and in many instances unfit for human consumption because of the poisonous character of the impurities contained. In view of the present situation respecting the distillation and sale of whiskey, it becomes necessary to either delay the sale of whiskey manufactured for a considerable period of time in an effort to properly mellow and age the same, or to sell the newly made whiskey with all of its impurities and objectionable features with respect to mellowness remaining.

The process contemplated by this invention has overcome the aforesaid objections and since the first few steps may be used in either a continuous run or batch run still, the method of procedure respecting the first type of still will first be set down.

In a continuous run still the step to remove impurities from the liquor being manufactured takes place at the completion of the fermentation of the mash. As the mash is being heated for the purpose of drawing off vapors which are later condensed and produce the liquor, a quantity of activated carbon is introduced into the mash in the ratio of from one to three pounds of activated carbon per each hundred gallons of mash being treated. Obviously, the introduction of this activated carbon in finely powdered form while the mash is boiling will cause a considerable intermixing of the mash and activated carbon so that the latter might adsorb all of the impurities that would normally pass over and through the still and be carried into the liquor being made. Such injurious and harmful ingredients as fusel oil and other substances are adsorbed by the activated carbon and after the first quantity of activated carbon has been used to the fullest possible extent, it is disposed of with the mash. The pure raw whiskey which results at the end of this particular step of the process is treated as hereinafter set down.

In the case of batch run stills, the liquor is produced from the mash in the ordinary fashion, but for the purpose of carrying out this invention, is returned to the still for redistillation and purging of impurities by the activated carbon. When the liquor is returned to the still, substantially twenty-five percent of its volume of water may be added prior to redistillation and one pound of powdered activated carbon per each hundred gallons of liquor is intimately mixed with the latter so that as soon as heat is applied, evolved vapors passing through the still arise, but do not carry with them the impurities of the character just above mentioned. Adsorption of the impurities by the activated carbon is the action which takes place and ordinary practices of distillation may be followed while using this method of purging the liquor of impurities.

The residue which remains in the original liquor to which the activated carbon was added depends entirely upon the proof of whiskey or liquor desired and its purity at the start. The raw, pure whiskey obtained at this point in batch distillation is the same as that obtained in a continuous run still and from this point on the raw, pure, colorless whiskey is treated to produce a mellow and fully aged liquor having all the characteristics of pure whiskey as recognized by the industry.

The raw, pure, colorless whiskey is now placed in a receptacle which has been internally charred for the purpose of expediting the liberation of tannic acid which is the chief ingredient that imparts color and mellowness to the liquor. It is preferable to use a relatively heavy, white oak key or barrel that has been strongly made to withstand internal pressures and which has been rather deeply charred over its entire internal surface. In sealing this receptacle, care should be taken that liquor to an amount insufficient to completely fill the receptacle is introduced. In this manner there is ample space for expansion and accommodation of evolved vapors. The receptacle is tightly sealed and then submerged in liquid. This submersion preferably takes place in water, after which the liquid is heated to a temperature within the range of from 175 degrees F. to 200 degrees F. This temperature might be increased to a maximum of 212 degrees F., but at this point there is some danger and such practice is not required nor advisable. It has been found that heating the water wherein the receptacle with its liquor is submerged to a temperature of 190 degrees F. for a period of twenty-four hours accomplishes exceptionally fine results with respect to mellowing and aging the liquor. The variation in temperature should vary in direct proportion to the time as indicated by the 190 degrees F. for twenty-four hours.

Subjecting the liquid to such high temperatures drives heat into the liquor through the charred wall of the receptacle which produces the result desired. It has been made apparent that mellowing and aging in accordance with the above process produces a liquor having the characteristics of liquor aged under the ordinary well known practices for many years. Apparently tannic acid is liberated in greater quantities because of the use of liquid as a medium to carry the heat to the receptacle and in order to further expedite the action, it is advisable to violently agitate the liquor within the receptacle for at least one minute every hour that heat is being applied. This agitation or churning should take place at regular intervals, but the temperature should be allowed to lower appreciably as such agitation takes place. Maintaining the receptacle submerged apparently keeps the ingredients within the liquor because of the insulating properties of the liquid and since the walls of the receptacle cannot open during the application of a moist heat, the liquor will not lose any of the properties required to make it mellow.

After the period just mentioned, the color of the whiskey is exactly as it should be and the flavor is distinctive and better than that of whiskey produced under the ordinary practices heretofore employed.

As a final step in this process, the temperature of the liquor and its receptacle must be allowed to lower to at least 100 degrees F. so that evolved vapors within the receptacle may condense and join the liquor before the keg is opened. This cooling may be expedited by the application of a cooling medium if desired, but gradual cooling is preferable.

Equipment necessary in following this process is not of a special nature and production of whiskey with the regular type of still may take place without alteration of the equipment. While certain specific figures are given respecting time, temperature and amounts, it must be remembered that the invention is meant to broadly disclose means for producing a desirable liquor having purity, mellowness and qualities of aged liquor that is equal to the best now known, but without the necessity of suffering the delays now required by the industry.

Having thus described the invention, what is claimed as new and desired to be secured by Letters Patent is:

1. The process of producing distilled alcoholic spirits which comprises forming a mash of material suitable for the production of alcoholic spirits, fermenting said mash to form a solution of mash suitable for heating to produce vapors, adding activated carbon in proportion of one to three pounds of activated carbon to each one hundred gallons of the solution of mash immediately prior to distillation thereof, causing distillation of the solution of mash, and condensing the vapors of distillation.

2. The process of producing distilled alcoholic spirits which comprises forming a mash of material suitable for the production of alcoholic spirits, fermenting said mash to form a solution of mash suitable for the production of vapors upon the application of heat; applying a sufficient amount of heat to boil the solution of mash, admixing activated carbon with said boiling mash, prior to drawing off vapors therefrom, and then collecting and condensing vapors arising from the boiling solution of mash with the added activated carbon, said activated carbon being added in the proportion of one to three pounds thereof to each one hundred gallons of solution of mash.

FREDERICK S. BOWDEN.
RICHARD B. BOWDEN.